US010664283B2

(12) United States Patent
Guo et al.

(10) Patent No.: US 10,664,283 B2
(45) Date of Patent: May 26, 2020

(54) COMPUTING SYSTEM AND CONTROLLER THEREOF

(71) Applicant: DeePhi Technology Co., Ltd., Beijing (CN)

(72) Inventors: Kaiyuan Guo, Beijing (CN); Song Yao, Beijing (CN)

(73) Assignee: BEIJING DEEPHI TECHNOLOGY CO., LTD., Beijing (CN)

( * ) Notice: Subject to any disclaimer, the term of this patent is extended or adjusted under 35 U.S.C. 154(b) by 170 days.

(21) Appl. No.: 15/620,353

(22) Filed: Jun. 12, 2017

(65) Prior Publication Data

US 2018/0011710 A1 Jan. 11, 2018

(30) Foreign Application Priority Data

Jul. 11, 2016 (CN) .......................... 2016 1 0543291

(51) Int. Cl.
*G06F 9/30* (2018.01)
*G06F 9/38* (2018.01)

(52) U.S. Cl.
CPC .......... *G06F 9/3838* (2013.01); *G06F 9/3857* (2013.01)

(58) Field of Classification Search
None
See application file for complete search history.

(56) References Cited

U.S. PATENT DOCUMENTS

| 5,317,701 A | * | 5/1994 | Reininger | ........... G06F 9/30149 |
| | | | | 712/207 |
| 6,112,019 A | * | 8/2000 | Chamdani | ............. G06F 9/3836 |
| | | | | 712/214 |
| 2016/0179434 A1 | | 6/2016 | Herrero Abellanas et al. | |

FOREIGN PATENT DOCUMENTS

CN 101710272 B 9/2012

* cited by examiner

*Primary Examiner* — Corey S Faherty
(74) *Attorney, Agent, or Firm* — IPro, PLLC

(57) ABSTRACT

Computing system and controller thereof are disclosed for ensuring the correct logical relationship between multiple instructions during their parallel execution. The computing system comprises: a plurality of functional modules each performing a respective function in response to an instruction for the given functional module; and a controller for determining whether or not to send an instruction to a corresponding functional module according to dependency relationship between the plurality of instructions.

14 Claims, 5 Drawing Sheets

COMPUTING SYSTEM AND CONTROLLER THEREOF

FIELD OF THE INVENTION

This invention relates to control field and, more particularly, to computing system and controller thereof.

BACKGROUND OF THE DISCLOSURE

With the continuous development of information technology, the application of computing systems is also increasingly widespread. For example, in the field of computer vision, Convolution Neural Network (CNN) computing system is widely used.

Generally speaking, in a computing system, a plurality of instructions is sequentially issued by, for example, a host computer. Then a plurality of functional modules, such as data input module, computation module, and data output module, perform the corresponding function in turn, according to these instructions.

A CNN computing system is quite complex. Various factors, for example, instruction scheduling, the use strategy of hardware modules will affect the efficiency and performance of the computing system.

If the program instructions from the host computer are performed one by one to control a respective functional module to carry out its corresponding function, when the functional module executes an operation according to an instruction, the subsequent instructions can not be executed, and maybe the other functional modules will be in idle state, and thus, it will be difficult for multiple functional modules to realize parallel operation.

On the other hand, if a plurality of functional modules executes corresponding operations simultaneously, each according to a respective instruction, it is possible to violate the logic of instruction execution. For example, when the computing module performs a computation operation of a computation instruction, it is necessary to read data from a specified location of the buffer, while the data should be inputted to the location by the data input module according to a data input instruction. Thus, it is necessary to control the computing module to perform the computation operation of this computation instruction after the data input module has completed the input operation of this data input instruction. Otherwise, the computing module may read an inappropriate value.

Thus, it is expected to ensure that the correct logical relationship between multiple instructions, while a plurality of functional modules of the computing system can each execute a respective instruction in parallel.

SUMMARY OF THE DISCLOSURE

This specification describes a computing system and a controller thereof, which can enable each of a plurality of functional modules executes a respective instruction in parallel, while ensuring the correct logical relationship between the plurality of instructions, thereby improving the computational efficiency.

In a general aspect, a computing system comprises: a plurality of functional modules each performing a respective function in response to an instruction for the given functional module; and a controller for determining whether to send an instruction to the corresponding functional module according to the dependency relationship between the plurality of instructions.

In another aspect, a controller of the above system is also provided.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
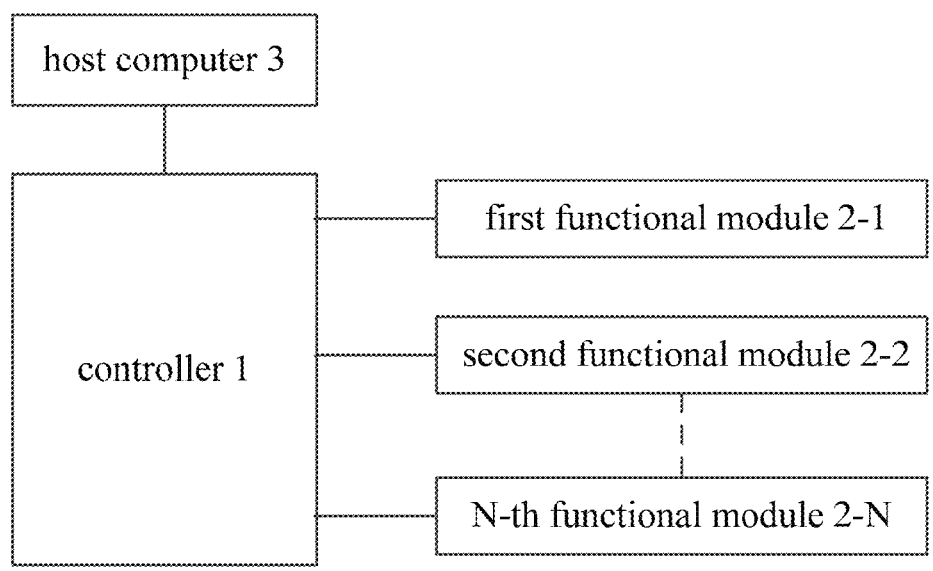
FIG. 1 shows a block diagram of computing system configured in accordance with an embodiment of the present disclosure.

Preferred embodiments of the present disclosure will be described in more detail below with reference to the accompanying drawings. While the preferred embodiments of the present disclosure are shown in the drawings, it should be understood that the present disclosure may be embodied in various forms and should not be limited to the embodiments set forth herein. Rather, these embodiments are provided in order to make the disclosure more thorough and complete, and to fully convey the scope of the disclosure to those skilled in the art.

FIG. 1 shows a block diagram of computing system configured in accordance with an embodiment of the present disclosure.

Referring to FIG. 1, the computing system of the present embodiment includes a controller 1, a host computer 3, and a plurality of functional modules (see the first functional module 2-1, the second functional module 2-2, the N-th functional module 2-N, N is a natural number greater than or equal to 2).

However, FIG. 1 shows an alternative embodiment of the present disclosure. It should be understood that the computing system of the present disclosure may not include the host computer 3, but only the controller 1 and the plurality of functional modules 2-1, 2-2, . . . , 2-N. In other words, the host computer 3 may be implemented outside the computing system of the present disclosure.

A plurality of functional modules can be divided based on hardware structure, or can be divided based on the function. Preferably, it can be divided by hardware structure, which can facilitate the parallelization of multiple functional modules. In the following description, a functional module can be regarded as a hardware module.

For example, the functional module may include a data input module, a computing module, and a data output module. Alternatively, the functional module may include a data input module, a plurality of computing modules running in parallel, and a data output module.

The host computer 3 may send an instruction to the controller 1. The instructions sent by the host computer 3 can be divided into a plurality of types, each corresponding to a respective functional module. Here, the instructions are sorted according to the functional modules that executing the instructions. The execution of each instruction involves only one functional module, which facilitates the operation of multiple functions in parallel with multiple instructions.

For example, in the case where the functional module includes a data input module, a computing module, and a data output module, the instructions may be divided into data input instructions, computation instructions, and data output instructions. In the case where the functional module includes a data input module, a plurality of computing modules running in parallel and a data output module, the instructions can be divided into data input instructions, computation instructions for different computing modules and the data output instructions. The computation instructions for different computing modules can be considered as different types of instructions.

The plurality of instructions sent by the host computer 3 may have certain dependencies. For example, for two instructions, it may be referred to as "preceding instruction" and "following instruction", depending on the chronological order. When the execution of the following instruction is based on the completion of the preceding instruction, there is a certain dependency between the two instructions, in other words, the following instruction relies on the preceding instruction.

The dependency relationship between the instructions and the instruction scheduling based on the dependency are further illustrated below with reference to FIGS. 2 and 3.

When multiple functional modules execute corresponding operations, the instructions corresponding to multiple functional modules may have certain dependencies. For example, an instruction executed by a functional module requires the operation result data of the instruction executed by another functional module on which it depends, to perform the related operation.

Figure 2:
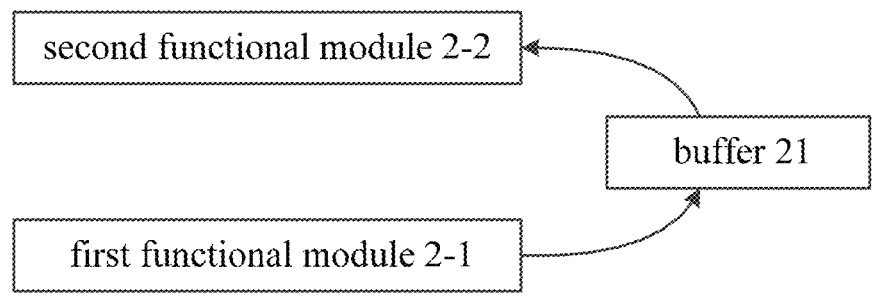
FIG. 2 shows a diagram explaining the logical relationship between the instructions executed by the two functional modules.

As an example, FIG. 2 is a diagram explaining the logical relationship between the instructions executed by the two functional modules.

As shown in FIG. 2, the first functional module 2-1 and the second functional module 2-2 may correspond to the first type instruction and the second type instruction, respectively. For example, a buffer 21 may be provided between the first functional module 2-1 and the second functional module 2-2.

The first functional module 2-1 may write its operation result to the specified location on the buffer 21 specified by the instruction parameter of the first type instruction, and the second functional module 2-2 may read the data from the specified location on the buffer 21 specified by the instruction parameter of the second type instruction.

Thus, the first type instruction may rely on a preceding second type instruction that reads data from its specified location. Here, these two instructions specify the same location. The first type instruction can only be executed if the preceding second type instruction has read data from the specified location. Otherwise, the operation result of the following first type instruction will overwrite the data on the buffer 21 that has not been read by the preceding second type instruction.

On the other hand, the second type instruction may also rely on the preceding first type instruction that writes the operation result (data) to the specified location thereof. The second type instruction uses the data that the first type instruction write to the specified location in the buffer. Here, these two instructions also specify the same location. This following second type instruction can be executed only if the preceding first type instruction has already written data to the specified location. Otherwise, the second type instruction can not correctly read the data that has not been written by the preceding first type instruction, that is, the erroneous data may be read.

In other words, the first type instruction and the second type instruction may be interdependent.

Specifically, in order to performs the related operation, the second functional module 2-2 read data from the buffer 21 which is written by the first functional module 2-1. Therefore, only after the first functional module 2-1 executes the preceding first type instruction and writes the operation result data to the specified location on the buffer 21, the second functional module 2-2 can execute the second type instruction, to read data from the specified location on buffer 21 and perform the associated operation. Thus, the second type instruction relies on a preceding first type instruction that writes the operation result to the specified location thereof Accordingly, when the first functional module 2-1 executes the first type instruction and writes the operation result to the specified location on the buffer 21, the operation result written in accordance with the preceding first type instruction will be overwritten, and therefore, it is necessary to ensure that the second functional module 2-2 has read the preceding operation result from the specified location on the buffer 21. Thus, the first type instruction relies on the preceding second type instruction that reads data from its specified location.

Figure 3:
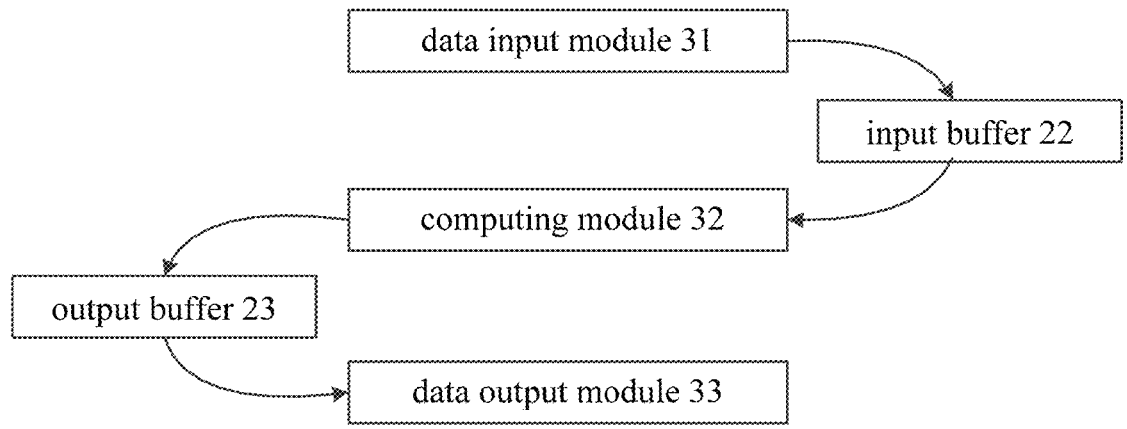
FIG. 3 shows a diagram explaining the logical relationship between the instructions executed by a plurality of functional modules according to an embodiment of the present disclosure.

FIG. 3 is a diagram explaining the logical relationship between instructions executed by a plurality of functional modules according to one embodiment.

Referring to FIG. 3, for example, when the computing system is applied to CNN computation, the plurality of functional modules may include a data input module 31, a computing module 32, and a data output module 33. The data input module 31, the computing module 32, and the data output module 33 may execute data input instructions, computation instructions, and data output instructions, respectively.

An input buffer 22 may be arranged between the data input module 31 and the computing module 32. An output buffer 23 may be arranged between the data output module 33 and the computing module 32.

The data input module 31 may write data that is read from an external storage (not shown) into the input buffer 22.

The computing module 32 may read the data from the input buffer 22, performs the computation, and writes the computation result into the output buffer 23.

The data output module 33 may read the data in the output buffer 23 and writes the data to an external storage (not shown).

The data input instruction may rely on the preceding computing instruction that reads data from its specified location.

The computing instruction may rely on the preceding data input instruction that writes data to its specified location.

The data output instruction may rely on the preceding computing instruction that writes a computation result to its specified location.

Specifically, the data read from the input buffer 22 by the computing module 32 for performing the related computation is written by the data input module 31. Therefore, only after the data input module 31 executes the preceding input instruction and writes the data to the specified location on the input buffer 22, the computing module 32 can read the data from the specified location to perform the operation corresponding to the computation instruction. Thus, the computation instruction may rely on the preceding data input instruction that writes data to the specified location thereof.

Accordingly, when the data input module 31 executes the data input instruction and writes the data to the specified on the input buffer 22, the data written in accordance with the preceding input instruction is overwritten, and therefore, it is necessary to ensure that the computing module 32 has already read the preceding data from input buffer 22. Thus, the data input instruction may rely on the preceding computation instruction for reading data from its specified location.

The data output module 33 executes the data output instruction and reads the data on the output buffer 23 which is input by the computing module 32. Thus, only after the computing module 32 writes data to a specified location on the output buffer 23 in response to the preceding computation instruction, the data output module 33 can read the data from the specified location to perform the output operation. Thus, the data output instruction may rely on the preceding computation instruction for writing the computation result to the specified location thereof.

In addition, compared to the operation of computing module 32, the data output operation of the data output module 33 is relatively short. Therefore, it can be assumed that the data output module 33 has outputted the data to the specified location of the output buffer 23 when the computing module 32 writes the computation result to the specified location. Thus, the operation of the computing module 32 to write the computation result to the output buffer 23 may be performed irrespective of whether the data output module 33 has performed the last output operation. That is, the computation instruction data may not depend on the preceding output instruction that reads the computation result from its specified location.

Thus, the plurality of functional modules can be divided into a data input module 31, a computing module 32, and a data output module 33 in accordance with the input, computation and output. The parallel processing of the data input module 31, the computing module 32, and the data output module 33 can be realized by the scheduling of the controller.

For example, a plurality of functional modules may be divided into the functional modules shown in FIG. 3. The data input module 31 may be used to input the input data of the plurality of input channels. The computing module 32 may perform CNN computation on the input data of the plurality of input channels to obtain the output data of the plurality of output channels. The data output module 33 may output the output data of the plurality of output channels.

After receiving the plurality of instructions, the controller 1 can determine whether to send an instruction to its corresponding functional module according to the dependencies among the plurality of instructions.

Specifically, after receiving a plurality of instructions, for one of the instructions, the controller 1 may send the instruction to its corresponding functional module if the preceding instruction on which the instruction depends has been completed, so that the corresponding functional module can perform the operation corresponding to the instruction.

On the other hand, if the preceding instruction on which the instruction depends has not been completed, the instruction is temporarily not transmitted to the corresponding functional module.

The instructions referred to herein may have a certain format in order to facilitate the controller 1 to recognize the dependencies between the instructions it receives. For example, the instructions described herein may be instructions of the format shown in FIG. 4.

Figure 4:
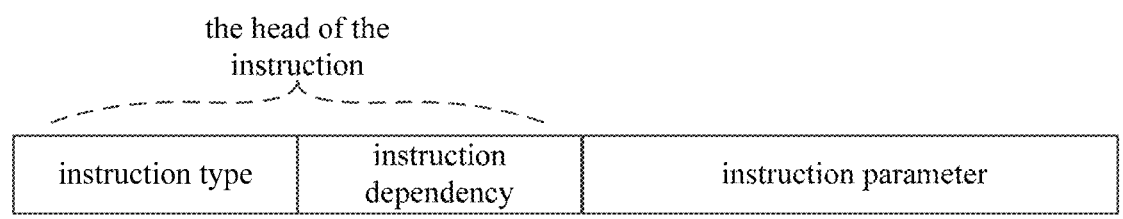
FIG. 4 shows a diagram of instruction format.

FIG. 4 shows a diagram of an instruction format that may be used in accordance with the technical solution of the present disclosure.

Referring to FIG. 4, an instruction may include an instruction type field and a instruction dependency field.

The instruction type field can indicate the type of an instruction, that is, the functional module corresponding to the instruction.

The instruction dependency field can indicate the preceding instruction on which the instruction depends, that is, the dependency between the instructions.

The instruction dependency field may be represented based on the relative specified between the instruction and the preceding instruction on which it depends. In one embodiment, it may be represented based on the difference between the sequence number of the instruction and the sequence number of the preceding instruction on which it depends. In other words, based on the location the preceding instruction counting forward. For example, if the instruction dependency field contains four bits, "0000" indicates that the instruction relies on the preceding instruction next to the instruction, and "1111" indicates that the instruction relies on the 16th instruction counting forward from the given instruction.

FIG. 4 shows that the instruction type field and the instruction dependency field are located at the head of the instruction. However, it should be understood by those skilled in the art that the instruction type field and the instruction dependency field may also be at any other specified location of the instruction.

In addition, the instructions may also include an instruction parameter field. The instruction parameter field may indicate an instruction parameter related to the operation performed by the corresponding functional module.

Here, the instruction parameter field shown in FIG. 4 may represent the relevant parameters involved in the computation process (e.g., CNN computation). For example, for the input data instruction and the output data instruction, the instruction parameter field may include the number of input channels of the data to be conveyed, the size of each input channel, the address in the external storage, and the address in the local storage. For example, for a computation instruction, the instruction parameter field may include the address of the data stored in the local storage, the number of input channels of the data used, the size of each input channel, and the parameters used in the computation process like convolution kernel, pooling, and non-linear operations.

Thus, when the computing system is used for the CNN computation, the instruction parameters can contain the parameters that may be changed during most CNN computation, so that the various types of CNN computation can be supported.

Figure 5:
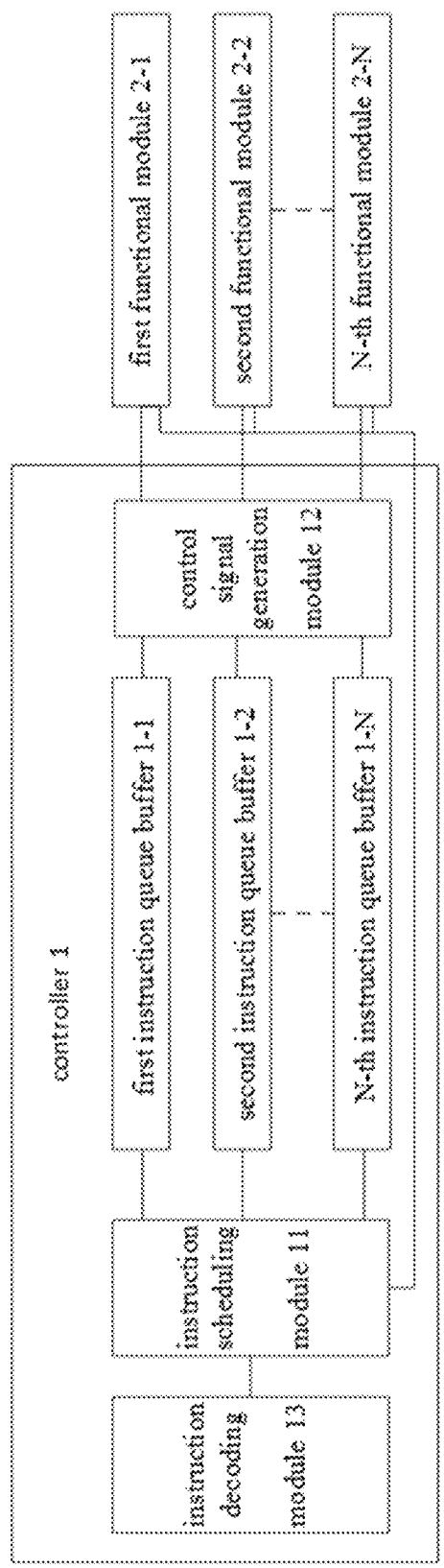
FIG. 5 shows a block diagram of controller structure configured in accordance with an embodiment of the present disclosure.

FIG. 5 shows a schematic block diagram of the structure of a controller according to an embodiment of the present disclosure.

As shown in FIG. 5, the controller 1 may include multiple instruction queue buffers (see the first instruction queue buffer 1-1, the second instruction queue buffer 1-2 . . . the N-th instruction queue buffer 1-N, N is a natural number greater than or equal to 2) and an instruction scheduling module 11.

Each instruction queue buffer may correspond to a functional module, and may be used to store the instruction queue for its corresponding functional module so as to provide the instruction to be executed to its corresponding functional module in turn.

As described above, in the case where the instruction is classified according to the functional module executing the instruction, the instruction in each instruction queue buffer corresponds to the instruction of its corresponding functional module. The instruction queue is a collection of instructions corresponding to the same functional module.

The instruction scheduling module 11 may determine whether the operation of the preceding instruction on which a following instruction depends has been completed and, in the case where it is determined that the operation of the preceding instruction has been completed, the instruction in the following instruction can be stored to the tail of its corresponding instruction queue buffer.

In fact, since there is no dependency between any instruction that has been stored in any instruction queue, the new instruction can also be stored at a location other than the tail of the instruction queue, such as the head of the queue or any specified on the queue.

However, since the preceding instruction may depend on the earlier instruction in the subsequent instruction, it would be advantageous to queue in the instruction queue in the order in which the same type of instruction was issued.

On the other hand, the controller 1 may assign the sequence numbers sequentially to the instructions in the order in which they are received. That is, a larger sequence number is assigned for the post-issued instruction. The sequence number can also be assigned by the host computer 3, or an instruction can also take the sequence number by itself.

Ordering the same type of instructions in the order in which they are issued can ensure that the same type of instructions is executed sequentially in their ascending order. It also facilitates the subsequent analysis and scheduling of subsequent instructions to determine whether the operation of the preceding instruction on which it depends has been completed.

The instruction scheduling module 11 may obtain operation status signals from a plurality of functional modules to determine whether the operation of the preceding instruction has been completed or not.

In one embodiment, the instruction scheduling module 11 acquires the sequence numbers of the instructions being executed by each functional module from the plurality of functional modules, respectively. In the case of ensuring that the same type of instructions is sequentially inputted into the instruction queue and executed sequentially, it is only necessary to compare whether the sequence number of the preceding instruction on which the instruction of the current analysis and scheduling processing depends is less than the sequence number of the instructions being executed by each of the functional modules. If so, it can be shown that the preceding instruction has been executed.

If the instruction scheduling module 11 can not determine that the operation of the preceding instruction has been completed, the instruction scheduling module 11 temporarily does not store the following instruction in the instruction queue.

Thus, the preceding instructions that the instructions in the instruction queue depend on have been executed, these instructions only need to wait in line for the corresponding functional modules to execute. When multiple instruction queues each has multiple instructions, the parallel operation of multiple functional modules can be achieved, without causing a logical error in the order of instruction execution.

On the other hand, if the instruction queue buffer is full, the instruction scheduling module 11 temporarily does not store the following instruction in the instruction queue. In addition, the instruction scheduling module 11 may be configured to perform the above analysis and scheduling processing for one type of instruction only if the instruction queue corresponding to this type of instruction is not full.

On the other hand, in the case where an instruction includes a plurality of segments, the instruction may be stored in a buffer segment by segment (or field by field). In this case, it is only necessary to determine whether the instruction queue is full after a segment (or a field) of an instruction is stored. If not, continue to the next segment (or the next field). If so, wait for the instruction queue to make room for the next segment (or the next field).

The instruction scheduling module 11 may suspend the analysis and scheduling of all subsequent instructions until an instruction can be stored in its corresponding instruction queue.

Thus, it is possible to ensure that, for the instructions of the same type, the instructions that first enter the corresponding instruction queue and thus first be executed by the corresponding functional module may have a smaller sequence number. And it is convenient for the subsequent instruction to judge whether the operation of the instruction on which it depends has been completed or not.

Alternatively, the instruction scheduling module 11 may skip the instruction and continue the analyzation and scheduling for subsequent instructions. And where a preceding instruction on which a subsequent instruction depends has been completed and the instruction queue corresponding to the subsequent instruction is not full, the subsequent instruction can be stored in the tail of the corresponding instruction queue.

In this case, if only the subsequent instructions with different type from the instruction are analyzed and scheduled, and the subsequent instructions with the same type continue to wait after the instruction, instructions of same type can also be ensured to be executed in descending order. And if subsequent instruction with the same type are also analyzed and scheduled in advance, it is possible to determine whether the preceding instruction on which the subsequent instruction depends has been completed or not in other ways. For example, the sequence number of the preceding instruction that the instruction depends can be compared with all sequence numbers of the instructions in all queues and being executed by each functional module. If there is a match, it indicates that the preceding instruction on which it depends has not yet completed. If not, it indicates that the preceding instructions on which it depends has been completed. When there are lots of instructions in the queues, this approach requires a lot of comparison operations.

Here, the instruction scheduling module 11 may be implemented by logic circuits or by program codes. Preferably, the instruction scheduling module 11 is implemented as a logic circuit, which can improve the processing speed of the instruction scheduling module 11.

Figure 6:
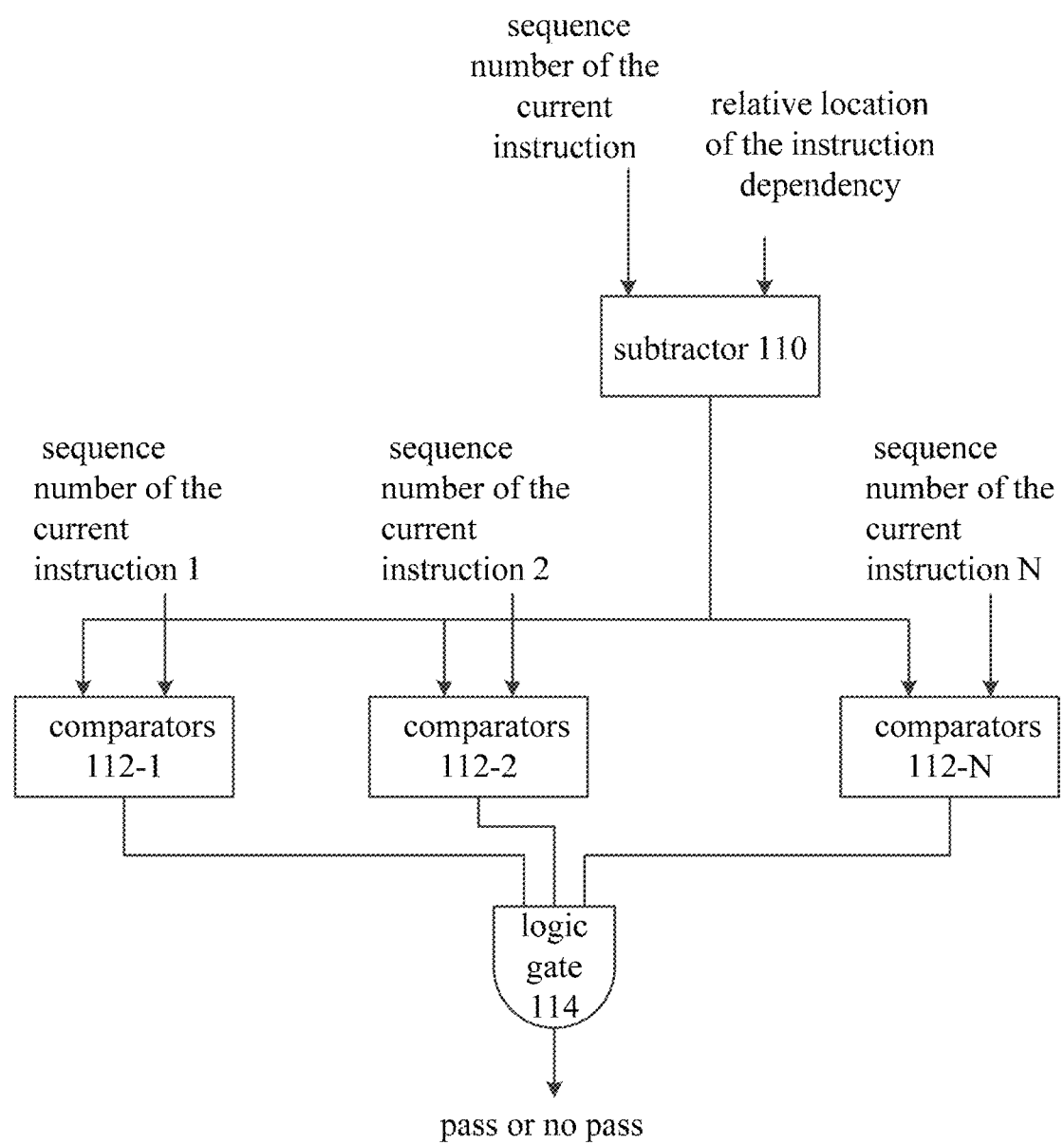
FIG. 6 shows a possible logical module that the instruction scheduling module 11 may have, which may be used to determine whether the preceding instruction on which the current instruction depends has been executed.

FIG. 6 schematically shows a possible logical module that the instruction scheduling module 11 may have, which may be used to determine whether the preceding instruction on which the current instruction depends has been executed.

The instruction scheduling module 11 may obtain the sequence number of the current instruction being executed by each of the plurality of functional modules from the functional modules 2-1, 2-2, . . . , 2-N, respectively.

As shown in FIG. 6, the instruction scheduling module 11 may include a plurality of comparators 112-1, 112-2, . . . , 112-N and a logic gate 114.

The comparators 112-1, 112-2, . . . , 112-N are used to compare the sequence number of the current instruction being executed by these functional modules with the sequence number of the preceding instruction on which the current instruction processed by the instruction scheduling module 11 depends.

The logic gate 114 synthesizes the comparison results of the comparators 112-1, 112-2, . . . , 112-N to determine whether the operation of the online instruction has been completed or not, thereby giving a "pass" or "no pass" judgment result.

In the case where the comparison results of the comparators all indicate that the sequence number of the current instruction is greater than the sequence number of the preceding instruction, the logic gate 114 issues a completion signal to indicate that the operation of the preceding instruction has been completed.

For example, when the comparators 112-1, 112-2, . . . , 112-N denote a logical "true" ("TRUE") indicating that the sequence number of the current instruction is greater than the sequence number of the preceding instruction, the logic gate 114 can be an And gate.

As described above, the instruction dependency field may be set based on the difference (relative specified) of the sequence number of the instruction and the sequence number of the preceding instruction on which it depends.

In this case, the instruction scheduling module 11 may also include a subtractor 110.

The subtractor 110 may determine the sequence number of the preceding instruction on which the current instruction depends, based on the sequence number of the current instruction and the data of the instruction dependency field.

When the data in the instruction field is the difference between the sequence number of the instruction and the sequence number of the preceding instruction on which it depends, the data of the instruction dependency field can be subtracted directly from the sequence number of the current instruction to get the sequence number of the preceding instruction on which the current instruction depends.

When the data in the instruction dependency field is, for example, a value obtained by adding or subtracting a predetermined value on the basis of the above difference value, for example, as described above, when "0000" indicates that the difference between sequence numbers is 1, the value of the instruction dependency field can be subtracted from the sequence number of the current instruction, then a predetermined value can be added or subtracted, to get the sequence number of the preceding instruction on which the current instruction depends.

Referring back to FIG. 5, preferably, the controller 1 may also include a control signal generation module 12. The control signal generation module 12 may sequentially generate a respective control signal based on the instructions in the instruction queue buffer and send the control signal to the corresponding functional module of the instruction queue buffer.

The control signal generation module 12 may also be included in each of the functional modules. The controller only needs to send the instruction in the instruction queue sequentially to the corresponding functional module, and a functional module can generate a control signal according to an instruction by itself, in order to carry out the corresponding function.

Thus, the control signal generation module 12 may sequentially generate control signals corresponding to the instructions in the instruction queue buffer and send those control signals to the corresponding functional modules, so that the corresponding functional modules can perform the corresponding operation in response to the received control signals.

Referring back to FIG. 5, the controller 1 may further include an instruction decode module 13. When the format of the instruction received by the controller 1 is in the format shown in FIG. 4, the instruction decoding module 13 can recognize the type of the instruction and the preceding instruction on which it depends, respectively, from the instruction type field and the instruction dependency field of the given instruction.

The controller 1 may also not include the instruction decoding module 13. In this case, the instruction decoding unit may be provided outside the controller 1, and the instruction type and the preceding instruction on which it depends can be acquired by the controller 1 itself at a specified location (e.g., a head) from the instruction. As described above, it is possible to decide whether or not to add the current instruction to the instruction queue buffer of the corresponding type, based on the dependency instruction of the input instruction and the current operation status signal of the respective modules. The operation status signal may include, for example, the sequence number of the instruction that each module is currently executing.

Further, by setting the instruction dependency field in the instruction, the controller can handle the data dependency between the instructions by hardware, thus ensuring the logical correctness of the instruction execution. Thus, the instruction issuer only need to issue instructions to the controller, without the need to repeatedly check each functional module status signal to determine the time of issuing.

In addition, the parallel operation of different functional modules can be achieved through the controller maintains the instructions for different functional modules independently, to improve computing efficiency.

Figure 7:
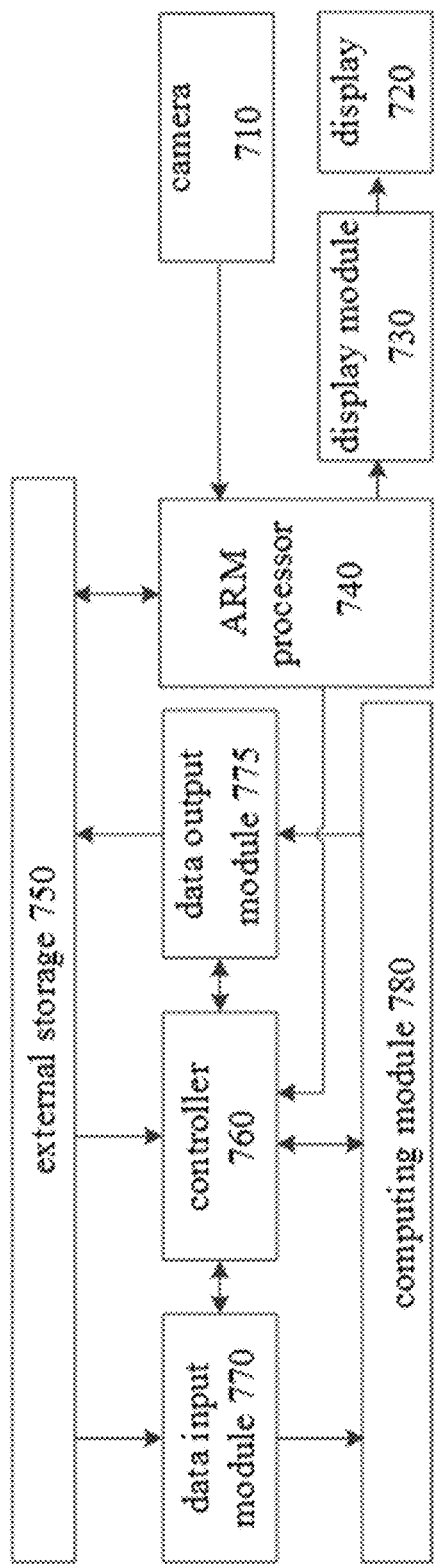
FIG. 7 shows a block diagram of an image processing system constructed using the computing system of the present disclosure.

FIG. 7 shows a schematic block diagram of an image processing system constructed using the computing system of the present disclosure.

As shown in FIG. 7, the image processing system is built on a system-on-chip (SoC) platform that includes CPUs and FPGAs (Field Programmable Gate Arrays).

The external storage 750, the camera 710, and the display 720 are portions outside the SoC. The data input module 770, the computing module 780, the data output module 775, the controller 760, and the display module 730 may be implemented on an FPGA, and CPU is the ARM processor 740.

The data input module 770, the computing module 780, and the data output module 775 correspond to the plurality of functional modules described in the above-described computing system, and the controller 760 corresponds to the controller described in the above-described computing system. The computing module 780 may also be divided into a plurality of sub-computing modules to process a certain type of computation instruction, respectively. The display module 730 may be a hardware driver for the HDMI (High Definition Multimedia Interface) output. The ARM processor 740 corresponds to the host computer described in the above-described computing system.

The image processing system can be applied to face detection, and the feature points on the face can be calibrated by CNN computation. The ARM processor 740 is responsible for controlling the main flow of the face detection algorithm. The controller 760 in the FPGA section can be used as an accelerator for CNN computation, and can be used to control the CNN computational part in the algorithm. The computing module 780 is used to perform CNN computation.

Specifically, in the process of face detection, the data may be first read by the ARM processor 740 from the camera 710 and stored in the external storage 750. The ARM processor 740 may then perform data preprocessing and face-searching operations, and store the alternate face images in the external storage 750. After that, the ARM processor 740 may trigger the controller 760 to read the instruction from the external storage 750 and begin the CNN computational part. The instructions may include data input instructions, computation instructions, and data output instructions. The data input instruction instructs the data input module 770 to read data from the external storage 750. The computation instruction instructs the computing module 780 to perform the computation. The data output instruction instructs the data output module 775 to output the data to the external storage 750.

The computation of CNN portion is mainly implemented by the controller 760, the data input module 770, the computing module 780, and the data output module 775. The controller 760 controls the operation of the data input module 770, the computing module 780, and the data output module 775, in particular, controls the analysis and scheduling of instructions for the respective modules, respectively, as described above.

The position of each feature point on the face can be obtained through the computation of the CNN, to obtain accurate positioning. The data output module 775 in the FPGA may store the computation results to the external storage 750, which can then be read by the ARM processor 740 and converted into results that can be displayed on the screen. Those results then can be output to the display 720 through the display module 730.

The CNN-corresponding instruction sequence to be used in the face detection algorithm may be generated by the software in advance and stored in a specific location shared by the CPU and the FPGA in the external storage 750. During the operation of the system, the CPU can control the data transfer module to feed the instruction sequence to the controller 760 sequentially when the CNN computation is needed, without arranging the input of the instructions according to the specific instruction execution condition. The controller 760 will analyze and schedule the instructions according to the scheme of the present disclosure to realize parallel sequential execution of data input instructions, computation instructions, and data output instructions.

In addition, the structure of the CNN employed in the present embodiment may vary depending on the demand for the accuracy of the face detection. According to the different neural networks, different instruction sequence can be generated to complete the support to the different CNNs.

The computing system and its controller according to the present disclosure have been described in detail herein with reference to the accompanying drawings.

The embodiments of the present disclosure have been described above, and the foregoing description is exemplary and not exhaustive, and is not limited to the disclosed embodiments. Numerous modifications and variations will be apparent to those of ordinary skill in the art without departing from the scope and spirit of the illustrated embodiments. The choice of terminology used herein is intended to best explain the principles of the embodiments, the practical application or the improvement of the techniques in the market, or the other one of ordinary skill in the art will understand the embodiments disclosed herein.

What is claimed is:

1. A computing system comprising:
a plurality of functional modules, each performing a respective function in response to an instruction for a given functional module; and
a controller for determining whether to send an instruction to a corresponding functional module according to dependency relationships among a plurality of instructions,
wherein, when received by the controller, the instruction has a format that the controller can use to recognize dependency between the instruction and a preceding instruction, and the controller send the instruction to its corresponding functional module if the preceding instruction on which the instruction depends has been completed;
wherein the controller comprises:
a plurality of instruction queue buffers, each corresponding to a respective functional module, and being used for storing an instruction queue for the given functional module, for providing instructions to be executed to the functional module in turn, and
an instruction scheduling module for determining whether operation of the preceding instruction on which a following instruction depends has been completed and, when it is determined that the operation of the preceding instruction has been completed, storing the following instruction in a tail of the corresponding instruction queue;
wherein the instruction scheduling module acquires sequence numbers of current instructions being executed by each of the plurality of functional modules from the given functional module;
wherein the instruction scheduling module comprises:
a plurality of comparators, each for comparing the sequence numbers of the current instructions being executed by the respective one of the plurality of functional modules with the sequence number of the preceding instruction on which the instruction currently processed by the instruction scheduling module depends, and
a logic gate, when comparison results of all comparators indicate that the sequence numbers of the current instructions are greater than the sequence number of the preceding instruction, issuing a completion signal to indicate that the operation of the preceding instruction has been completed.

2. The computing system of claim 1, wherein, the controller further comprising:
a control signal generating module for sequentially generating a corresponding control signal based on the instructions in the instruction queue buffer and transmitting the control signal to the corresponding functional module of the instruction queue buffer.

3. The computing system of claim 1, wherein
the instructions are divided into a plurality of types, each corresponding to a respective functional module;
the instructions comprising an instruction type field for indicating the type of the instruction, and an instruction dependency field for indicating the preceding instruction on which the instruction depends,
the controller further comprising:
an instruction decoding module for recognizing the type of the instruction and the preceding instruction on which it depends, from the instruction type field and the instruction dependency field, respectively.

4. The computing system of claim 3, wherein,
the instruction dependency field being set based on difference between a sequence number of the instruction and a sequence number of the preceding instruction on which it depends,
the instruction scheduling module further comprising:
a subtractor for determining the sequence number of the preceding instruction on which a current instruction depends, based on the sequence number of the current instruction and data of the instruction dependency field.

5. The computing system of claim 4, wherein,
the plurality of functional modules including a first functional module and a second functional module, each corresponding to a first type instruction and a second type instruction, respectively,
a buffer is provided between the first functional module and the second functional module,
the first functional module writes its operation result to a specified location specified by an instruction parameter of the first type instruction on the buffer, the second functional module reads the data from a specified location specified by the instruction parameter of the second type instruction on the buffer,
the first type instruction relies on a preceding second type instruction that reads data from its specified location,
the second type instruction relies on a preceding first type instruction that writes operation result to its specified location.

6. The computing system of claim 5, wherein,
the plurality of functional modules including a data input module, a computing module and a data output module, to execute data input instructions, computing instructions and data output instructions, respectively;
an input buffer is arranged between the data input module and the computing module,
an output buffer is arranged between the data output module and the computing module,
the data input module writes data that is read from an external storage into the input buffer,
the computing module reads the data from the input buffer, performs the computation, and writes a computation result into the output buffer,
the data output module reads the data in the output buffer and writes the data to the external storage,
the data input instruction relies on a preceding computing instruction that reads data from its specified location,
a computing instruction relies on a preceding data input instruction that writes data to its specified location,
a data output instruction relies on the preceding computing instruction that writes the computation result to its specified location.

7. The computing system of claim 6, wherein, the computing system is a computing system for Convolution Neural Network computation,
the data input module inputs input data of a plurality of input channels,
the computing module performs CNN computation on the input data of a plurality of input channels to obtain output data of a plurality of output channels, and
the data output module outputs the output data of the plurality of output channels.

8. The computing system of claim 1, further comprising:
a host computer for transmitting the instructions to the controller.

9. A controller for scheduling instructions for a computing system, the computing system comprising a plurality of functional modules, each functional module executing a respective function in response to an instruction for a given functional module, and the controller determining whether to send an instruction to a corresponding functional module according to dependency relationships among a plurality of instructions,
wherein the controller comprises:
a plurality of instruction queue buffers, each corresponding to a respective functional module, and being used for storing an instruction queue for the given functional module, for providing instructions to be executed to the functional module in turn;
an instruction scheduling module for determining whether operation of a preceding instruction on which a following instruction depends has been completed and, when it is determined that the operation of the preceding instruction has been completed, storing the following instruction in a tail of the corresponding instruction queue;
wherein, when received by the controller, the instruction has a format that the controller can use to recognize dependency between the instruction and the preceding instruction;
wherein the instruction scheduling module acquires sequence numbers of current instructions being executed by each of the plurality of functional modules from the given functional module;
wherein the instruction scheduling module comprises:
a plurality of comparators, each for comparing the sequence numbers of the current instructions being executed by the respective one of the plurality of functional modules with a sequence number of the preceding instruction on which the instruction currently processed by the instruction scheduling module depends, and
a logic gate, when comparison results of all comparators indicate that the sequence numbers of the current instructions are greater than the sequence number of the preceding instruction, issuing a completion signal to indicate that the operation of the preceding instruction has been completed.

10. The controller of claim 9, further comprising:
a control signal generating module for sequentially generating a corresponding control signal based on the instructions in the instruction queue buffer and transmitting the control signal to the corresponding functional module of the instruction queue buffer.

11. The controller of claim 9, wherein
the instructions are divided into a plurality of types, each corresponding to a respective functional module;
the instructions comprising an instruction type field for indicating the type of the instruction, and an instruction dependency field for indicating the preceding instruction on which the instruction depends, the controller further comprising:

an instruction decoding module for recognizing the type of the instruction and the preceding instruction on which it depends, from the instruction type field and the instruction dependency field, respectively.

12. The controller of claim 11, wherein, the instruction dependency field being set based on difference between a sequence number of the instruction and a sequence number of the preceding instruction on which it depends, the instruction scheduling module further comprising:

a subtractor for determining the sequence number of the preceding instruction on which a current instruction depends, based on the sequence number of the current instruction and data of the instruction dependency field.

13. The controller of claim 11, wherein, the plurality of functional modules including a first functional module and a second functional module, each corresponding to a first type instruction and a second type instruction, respectively, a buffer is provided between the first functional module and the second functional module, the first functional module writes its operation result to a specified location specified by an instruction parameter of the first type instruction on the buffer, the second functional module reads data from a specified location specified by the instruction parameter of the second type instruction on the buffer, the first type instruction relies on a preceding second type instruction that reads data from its specified location, the second type instruction relies on a preceding first type instruction that writes operation result to its specified location.

14. The controller of claim 13, wherein, the plurality of functional modules including a data input module, a computing module and a data output module, to execute data input instructions, computing instructions and data output instructions, respectively;

an input buffer is arranged between the data input module and the computing module, an output buffer is arranged between the data output module and the computing module, the data input module writes data that is read from an external storage into the input buffer, the computing module reads the data from the input buffer, performs the computation, and writes a computation result into the output buffer, the data output module reads the data in the output buffer and writes the data to the external storage, the data input instruction relies on a preceding computing instruction that reads data from its specified location, the computing instruction relies on a preceding data input instruction that writes data to its specified location, the data output instruction relies on the preceding computing instruction that writes the computation result to its specified location.

* * * * *